Figure 1:
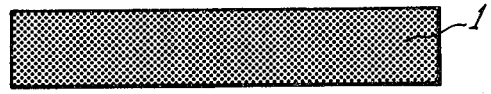

3,194,708
PRODUCTION OF LIGHT STRUCTURAL MEMBERS
Robert Fourcade, Gosnay, and Marcel Duhoo, Bruay-en-Artois, France, assignors to Houilleres du Bassin du Nord et du Pas-de-Calais, Douai, France, a French public establishment
Filed Nov. 2, 1960, Ser. No. 66,777
Claims priority, application France, Nov. 7, 1959, P.V. 809,721
1 Claim. (Cl. 156—279)

The present invention relates to a process for the manufacture of light structural members and to the members so produced, these members being characterised in general by the fact that they comprise a porous core and a hard and rigid surface and being usable as structural members, for example, as panels, partitions and flooring.

More particularly, these members comprise a core of porous material having a majority of closed cells such as an expanded synthetic resin, for example polyvinyl chloride, or agglomerated cork, and a hard superficial zone which is united, according to the invention, in an intimate manner with the core and which consists of a hardened polyester containing a fibrous filler and adapted to receive surface polishing.

It has already been proposed that a glass fibre fabric impregnated with a cross-linkable polyester composition containing styrene, for example, as a monomer, should be applied to the surface of an expanded polyvinyl chloride core and the polyester left to polymerise in situ while cold in order to produce structural members of this type. However the results obtained by this process are not satisfactory due to the cross-linkable polyester composition being either too viscous or too fluid. In the first case, the cells of the expanded material are not sufficiently penetrated by the constituents of the polyester composition and the adhesion of the latter to the cellular material is inadequate; there is mechanical attachment rather than true welding of the two layers. In the second case, the monomer diffuses rapidly into the cells of the expanded polyvinyl chloride with the result that the core is subjected to inflation and softening which deforms it and, at the end of the polymerisation, some unpolymerised monomer remains in the central zone of the core which is thus progressively destroyed.

It has also been proposed, in an attempt to improve the adhesion of the polyester-glass material to the expanded material, that the gelling time of the cross-linkable polyester should be maintained between 20 and 30 minutes but in fact this remedy is very inadequate because it does not take into consideration the fact that the monomer included in the polyester composition if it is not to diffuse by itself into expanded material where it would cause penetration in depth, should be incorporated in a polyester of appropriate nature and chain length and should be in a suitable proportion in relation to the polyester, and the fact that the penetration of the expanded material depends on the cellular structure, that is to say on the cell size, on the density of the material, etc.

It has further been proposed that an adhesive, such as cellulose acetate or epoxy resin, should be interposed between the fabric impregnated with liquid polyester and the porous core, being applied to the surface of the core. However stripping tests which have been carried out on the products obtained by this process show that the glass fabric polyester material is not very strongly attached to the core material so that the members are fragile.

We have now developed an improved process whereby all these disadvantages may be reduced or eliminated and which gives a unit member consisting of a light expanded core and a superficial zone reinforced with glass fabric and which is resistant to stripping of the superficial zone.

The member produced by this improved process can be used as a structural component by itself or may be incorporated in more complex panels, particularly in a manner which will be fully described below.

A process of making light structural members according to the invention comprises subjecting a core of porous material having a majority of closed cells to controlled impregnation with an unsaturated polyester composition containing a cross-linking monomer, the proportion of the latter in the composition being such that penetration thereof only takes place into a thin superficial zone of the porous core, polymerising the polyester composition at least partially in the superficial zone, covering the intermediate material thus obtained with a coating of fibres impregnated with a liquid or pregelled polyester composition, and then polymerising the coating thus applied in order to harden it and to fuse it to the polyester present in the superficial zone of the porous core and at the same time to complete, if necessary, the polymerisation of the latter.

If the core is of expanded polyvinyl chloride, the cross-linkable polyester composition used in the first step of this process penetrates into the thin walls of the closed cells of the superficial zone to a depth which depends on the structure of the polyvinyl foam and on the nature of the composition, the latter being determined by the nature and proportions of the constituents of the polycondensate, the chain length of the polycondensate (mean molecular weight) and the nature and proportion of the cross-linking monomer. The more viscous the polyester composition is, the less it tends to penetrate and the less deep the impregnation. By regulating the above variables characterising the composition of the polyester impregnant, it is therefore possible to obtain a greater or lesser depth of penetration of the impregnant into the expanded core. It is to be understood that contrary to the known process described above, the polyester composition never penetrates into the porous core beyond a superficial zone of limited thickness which is determined at will by the operator depending on the thickness of the core and on the thickness of the desired reinforced zone and that there is therefore no risk of the core becoming inflated or deformed. Likewise, contrary to the known process, the polyester composition does not only penetrate into the open or closed cells or pores in the core but also into the thin walls of these cells in such a manner that the whole mass of the zone affected by the penetration is reinforced during the polymerisation of the cross-linkable polyester.

In the second step of the process, when the polyester impregnant has thus penetrated into the superficial cells of the core, and their walls, it is polymerised in situ, at least partially, forming in said superficial zone a layer of material which plays a double part: in the first place, this layer of polyester polymerised in the cells and their walls consolidates and rigidifies the superficial zone of the expanded core and, in the second place, it prevents the is impregnated in the following phase of the process, from penetrating further into the porous core since the penetration front is blocked. This action is different from that of the adhesive which is employed in one of the above-described prior proposals. In the process of this prior proposal, the adhesive only penetrates to a greater or lesser extent into the open portions of the superficial cells of the expanded material and had no relationship, in its nature, with the polyester impregnating the covering layer, so that the dividing surface could only consist of a thin zone even when this zone was continuous, which explains the readiness which with the superficial covering layer can be stripped off. On the contrary, in the present invention, it is no longer a question of physical or mechanical attachment but of a bond in depth resulting both from impregnation in depth involving the penetration of the cells and their walls from the relationship between the polyester impregnant and the polyester impregnating the fibrous covering.

In the next step of the process, the members thus prepared are covered with fabrics or mats impregnated with liquid or gelled polyester which may, if desired, contain powdered and/or fibrous fillers, which coating may be effected by conventional means of application such as spraying with a gun, spreading by means of cylinders or application in sheets.

It should likewise be noted that although reference is made throughout this specification to plane porous cores, the process may equally well be applied to cores, and to the production of finished members, of other shapes. Such members may be produced directly in the final shape and dimensions desired.

As indicated above, the invention also relates to a means of assembling individual structural members according to the invention into more complex panels which are more rigid and stronger, which may be desirable when said panels are of large dimensions and/or have to serve purposes in which they may be called upon to withstand considerable stresses.

This means of assembly comprises, according to the invention, juxtaposing at least two members obtained as above, but not necessarily identical, interposing between them at least one sectional member made of hardened polyester and, where appropriate, completing the assembly by means of at least one additional member which completes the isolation of the sectional member from the outside, all the members thus assembled, which are of the same superficial nature thus facilitating their union, then being jointly subjected to a process similar to that disclosed with respect to each individual member, with a view to forming a unit panel having a continuous surface which is hard and strong.

Although reference has been made above to the application of the process according to the invention to cores of expanded polyvinyl chloride, the process may likewise be applied to other porous materials having a majority of closed cells and more particularly to cores obtained by the agglomeration of cork particles, for example by means of urea-formaldehyde resins. In this case, it may be an advantage to modify the composition of the polyester composition used to impregnate the core, for example by incorporating therein a powdered filler such as microdol, the process otherwise remaining substantially the same.

A particularly advantageous polyester composition for the initial impregnation of the core is one consisting of 100 parts by weight of a mixture:

| | Mol |
|---|---|
| Propylene glycol | 5 |
| Phthalic anhydride | 2 |
| Maleic acid | 3 | the condensation polymerisation of which is continued until an acid number of about 45 and a hydroxyl number of about 50 have been reached, which corresponds to an average molecular weight of 400 to 500 (the method of calculation does not permit of greater precision as regards order of magnitude), and 40 parts by weight of styrene.

These proportions may be somewhat altered and one of the constituents may be changed in order to adapt the composition to different types and densities of cellular material. In the case of the above specified composition, the depth of penetration of the resin into a commercial expanded polyvinyl chloride having a density of 60 kg./m.$^3$ is about 4 mm. and into agglomerated cork having a density of 100 kg./m.$^3$ it is 5 mm.

It is to be understood that the core impregnating composition should contain, at the moment of its application to the expanded core, the catalysts and accelerators necessary for its polymerisation whether cold or hot. Thus the composition indicated above may be applied, when diluted with acetone, by means of a spray-gun and it polymerises at 20° C. in about 20 minutes if it contains, for each 100 g. of resin, about 1.7 g. of benzoyl peroxide as catalyst and 2 g. of diethylaniline as accelerator.

Once the steps of impregnation and superficial polymerisation have been completed, the coating of the surface of the core with fibres, which may be woven or non-woven and which are preferably glass fibres, impregnated with polyester resin is effected; this polyester resin may be different from that employed in the initial impregnation, for example it may be more fluid. A preferred polyester for this purpose, for example, comprises 100 parts by weight of:

| | Mol |
|---|---|
| Propylene glycol | 4 |
| Diethylene glycol | 1 |
| Phthalic anhydride | 2 |
| Maleic acid | 3 | and 62 parts by weight of styrene.

The invention will now be described more fully and by way of example only with reference to the accompanying drawing which illustrates the successive steps of the process.

Figure 2:
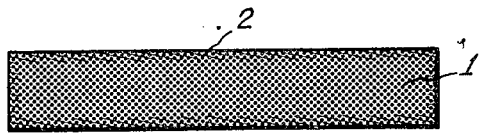
Figure 3:
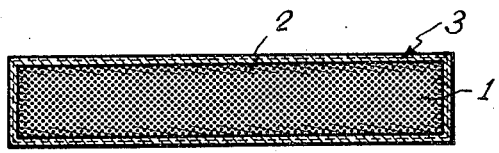

In the drawing, FIGURES 1, 2 and 3 diagrammatically illustrate respectively the bare expanded core, the core with its superficial zone reinforced by impregnation and polymerisation in situ of a polyester resin, and the material thus reinforced after coating with a layer of polyester resin reinforced with glass fibre.

Figure 4:
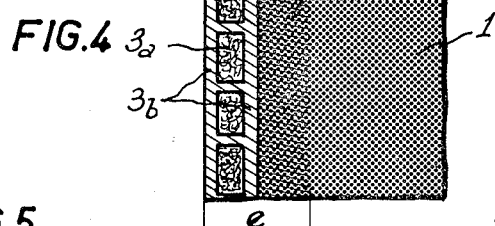
Figure 5:
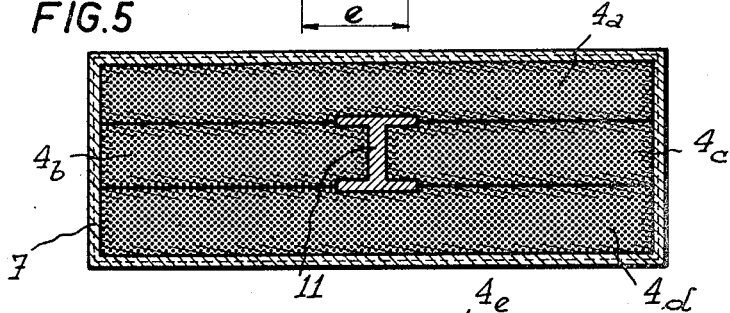
Figure 6:
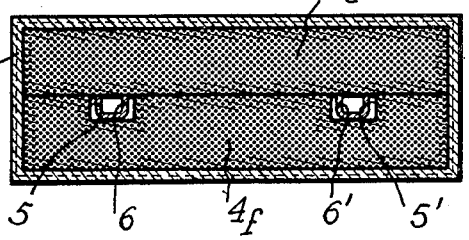
Figure 7:
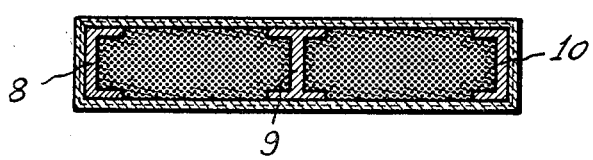

FIGURE 4 is a partial section similar to FIGURE 3 but on a much larger scale; and FIGURES 5–7 diagrammatically illustrate reinforced panels each composed of individual members similar to that in FIGURE 3 and of a sectional member of hard laminated polyester.

As can be seen in FIGURES 1 to 4, each member comprises a core of expanded polyvinyl chloride 1, consisting of a porous mass with a great majority of closed cells with the exception, in particular, of the cells forming the surface which are open at the surface. In the impregnation operation illustrated in FIGURE 2, the polyester resin penetrates into the cells and into their walls to a limited depth and is polymerised in situ forming a reinforced zone 2. In the next step of the process, the material consisting of the block of porous material with a reinforced surface is surrounded with a layer indicated generally at 3 and comprising a fibrous sheet 3a consisting either of glass fabric or non-woven fibres, impregnated with a polyester resin 3b, the whole being polymerised in situ. Referring to FIGURE 4, it will be seen clearly that around the core 1 there is thus formed a zone of thickness e comprising, from the inside to the outside, a certain thickness of polyvinyl chloride foam, then a certain thickness of glass fibre, the whole being impregnated with a polyester resin the presence of which over this whole thickness e ensures that in the finished member the attachment of the superficial layer 3 to the core is practically indestructible and that the finished member has a hard superficial reinforcement and can be thoroughly polished.

Referring now to FIGURES 5 and 6, these illustrate two possible variants among the many possible complex panel arrangements which can be obtained by the assembly of members of the type illustrated in FIGURE 3.

In FIGURE 5, the panel is formed from four members 4a, 4b, 4c and 4d, each of which has been prepared in the same way as the member of FIGURE 3, and an H-section member 11. The two centre members 4b, 4c are placed between the flanges of the H-section and abut against the central web thereof, while the other two members 4a, 4d cover the outside face of each flange of the H-section respectively. The assembly of the four members and the H-section is in turn covered on the outside with polyester-impregnated glass fibre to form a coating similar to the coating 3 on the individual member of FIGURES 3 and 4.

In the embodiment shown in FIGURE 6, the panel only comprises two members 4e, 4f, the member 4f having two grooves 5, 5' in which are inserted two U-sections 6, 6', and the grooved face of the member 4f being covered by the member 4e. The whole assembly is covered in turn by the coating 7 so as to form a single panel.

Finally, in FIGURE 7, the reinforcing sectional members 8, 9 and 10 enclose the members similar to that of FIGURE 3 instead of being embedded therein.

The principal advantages of panels such as those illustrated in FIGURES 5 to 7 are those which are customarily associated with panels of porous materials, that is to say good sound and heat insulating properties, and, in addition, the mechanical strength resulting from the presence of stiffening and reinforcing sectional members intimately bonded to the panels and finally the advantages resulting from the covering of reinforced polyester resin which practically cannot be stripped off and the surface of which can be rendered as smooth and polished as may be desired.

The invention will now be illustrated with reference to a specific example of its application, namely the manufacture of a member which is suitable for use as a prefabricated flooring panel.

The core of the member consisted of a block of commercial expanded polyvinyl chloride about 2 metres long, about 3 metres wide and 50 millimetres thick, reinforced with three U-sections each 50 x 35 x 3 millimetres.

The first step in the process was the application to this core of a polyester resin impregnant. Application was effected by spraying, with a spray-gun, two compositions one of which contains a catalyst and the other an accelerator, on to the surface of the core. In both compositions, the polyester resin consisted of 100 parts by weight of a mixture of:

|  | Mol |
|---|---|
| Propylene glycol | 5 |
| Phthalic anhydride | 2 |
| Maleic acid | 3 | and 40 parts by weight of styrene.

In a first tank the following composition was prepared:

|  | Parts by weight |
|---|---|
| Resin composition | 100 |
| Benzoyl peroxide catalyst | 3.4 |
| Green colouring | 1 |
| Acetone diluent | 8 |

The following composition was prepared in a second tank:

|  | Parts by weight |
|---|---|
| Resin composition | 100 |
| Diethylaniline accelerator | 4 |
| White colouring | 1 |
| Acetone diluent | 6 |

The contents of the two tanks were sprayed by means of two spray-guns, at a balanced rate, simultaneously on to the core, the two jets intermingling at the surface of the core. The quantity of resin thus sprayed was 300 g. per sq. metre length, that is to say in practice, 600 g. per sq. metre of member. Polymerisation was completed 15 minutes after spraying at the average room temperature of 25° C.

The second step of the process was the application of the resin-impregnated glass fibre. In the particular case in question, the glass fibres were used simultaneously in two forms: on the one hand glass fibres cut up and sprayed by blowing simultaneously with the spraying of resin, and on the other hand a glass fibre fabric applied to the surface of the core prior to this spraying.

The operation was carried out in a mould in the following steps:

First a layer of resin without fibres was sprayed onto the surface of the female mould at the rate of 300 g. per sq. metre; the layer of resin was obtained by the simultaneous spraying of the following two compositions:

| Composition No. 1: | Parts by weight |
|---|---|
| Resin A | 100 |
| Chlorinated paraffin | 5 |
| Benzoyl peroxide | 2.97 |
| Antimony oxide | 5 |

| Composition No. 2: | Parts by weight |
|---|---|
| Resin A | 100 |
| Chlorinated paraffin | 5 |
| Diethylaniline | 1 |
| Antimony oxide | 5 |
| Yellow colouring | 0.9 |

The composition of the resin A referred to was as follows:

100 parts by weight of a mixture of:

|  | Mol |
|---|---|
| Propylene glycol | 4 |
| Diethylene glycol | 1 |
| Phthalic anhydride | 2 |
| Maleic acid | 3 | and 62 parts by weight of styrene.

The benzoyl peroxide and diethylaniline act as catalyst and accelerator respectively; the chorinated paraffin and the antimony oxide were intended to render the resin self-extinguishing in case of fire.

Secondly, a mixture of the same polyester resin and glass fibres consisting of slivers with 60 ends cut to 40 mm., was sprayed onto the layer already applied, at the rate of 120 g. of fibre and 1940 g. of resin per sq. metre.

In a third step, a sheet of glass fabric L roving, 2 millimetres thick when dry and having a weight of 1350 g. per sq. metre was arranged over the two layers already applied. The same quantity of the resin-glass fibre mixture used in the second step was then sprayed onto this fabric.

The block of polyvinyl chloride which had been subjected to the above superficial impregnation, was prepared for application of the outer layer thereto by applying 400 g. per sq. metre of the same resin as was used to prepare the mould, to its lower face; the block was placed in the female mould and the same quantity (400 g. per sq. metre) of the same resin is sprayed on to its top face. Then the same layers as those which had been placed in the female mould, namely successively a layer of resin + fibre mixture, a layer of fabric and a layer of resin + fibre compound were applied on top of the whole in the same quantities as those indicated above.

Meanwhile, the male mould was prepared by spraying 300 g. per sq. metre of resin without fibres with a spray-gun. The male mould was then placed on top of the female mould containing the block and the layers indicated above, and subjected to pressure of 1 kg. per sq. cm.

The quantities of catalyst and accelerator used were such that at the room temperature of 20° C., gelling took place 1 hour 30 minutes after closing the mould, that is to say, in fact, 3 hours after the beginning of the lamination. The panel was removed from the mould about 12 hours after the mould had been closed.

The dimensions of the finished member were about 2 metres x 3 metres x 55 millimetres thick and it weighed 90 kg. The depth of penetration of the polyester resin into the polyvinyl chloride was 4 millimetres on all the faces of the member.

The mechanical properties of the finished member were then evaluated by carrying out tests on samples cut out of the covering of the member. The results obtained were as follows:

Tension:
Samples 10 x 2 x 80 mm. Length of stretching 50 mm. Stretching speed 20 mm./minute.
Breaking stress: 1342 kg./sq. cm.
Elongation percent: 10.48.
Young's modulus for tension: 12,800 kg./sq. cm.

Flexion:
Tests carried out on Dynstat.
Breaking stress: 1450 kg./sq. cm.
Young's bending modulus: 48,715 kg./sq. cm.

Shock:
Tests carried out on Dynstat.
Breaking strain: 420.3 kg./cm./cm./sq. cm.

Heat resistance:
This is defined by the temperature (° C.) at which the Young's bending modulus is equal to 4000 kg./sq. cm.
Value of $t°$: higher than 280° C. (at 280° C., bending modulus=10,000 kg./sq. cm.).

We claim:

A process comprising impregnating a cellular core having a majority of closed cells, to a pre-established controlled depth in a surface zone of the core with an unsatured polyester composition having a cross-linking monomer constituted by styrene, said core being of expanded polyvinyl chloride, said styrene being contained in said polyester composition in a quantity related to the cellular core to limit penetration to said pre-established depth, said polyester composition having a molecular weight of between 400 to 500 and including 100 parts by weight of a mixture of propylene glycol 5 mol, phthalic anhydride 2 mol, maleic acid 3 mol and 40 parts by weight of styrene, polymerizing the polyester composition at least partially in said surface zone to obtain a first layer in direct contact and bonded to said cellular core in said surface zone, covering said first layer with a coating of glass fibers impregnated with a second composition of polyester resin, the polymerization of the first said polyester composition being sufficient to block penetration of the second composition further into the core and then polymerizing the coating thus applied to form a second layer fused to the first layer while completing polymerization of any polyester composition in the first layer.

References Cited by the Examiner

UNITED STATES PATENTS

| | | | |
|---|---|---|---|
| 2,482,798 | 9/49 | Rheinfrank et al. | 154—45.95 XR |
| 2,839,442 | 6/58 | Whitaker | 154—45.9 XR |
| 2,875,117 | 2/59 | Potchen et al. | 154—45.9 |
| 2,908,602 | 10/59 | Collardeau et al. | 154—45.9 XR |

FOREIGN PATENTS 1,075,345  4/54  France.

OTHER REFERENCES

"FI–VI" Plastic, The Ship Builder and Marine Engine Builder, August 1958.

AIREX Bulletin, v. 4/59, September 15, 1959.

"Sandwich PVC Construction in Holland," published in Ship and Boat Builder, vol. 12, September 1959, pp. 304–07 cited.

"The Qualities of PVC with Glass Fiber," published in Ship and Boat Builder, September 1956, pp. 288–89 cited.

ALEXANDER WYMAN, *Primary Examiner.*

EARL M. BERGERT, CARL F. KRAFFT, *Examiners.*